United States Patent [19]

Hurlburt

[11] 3,722,195
[45] Mar. 27, 1973

[54] CUTTER BAR FOR MOWER
[75] Inventor: Joseph C. Hurlburt, Leola, Pa.
[73] Assignee: Sperry Rand Corporation, New Holland, Pa.
[22] Filed: Aug. 24, 1970
[21] Appl. No.: 66,370

[52] U.S. Cl. ................................................56/245
[51] Int. Cl. ............................................A01d 55/24
[58] Field of Search ..............56/244–245, 290–292;
30/304, 306; 143/32 H; 299/14, 82–84;
74/230.3, 243 PC

[56] References Cited

UNITED STATES PATENTS

| | | | |
|---|---|---|---|
| 3,545,188 | 12/1970 | Locati | 56/245 |
| 3,509,704 | 5/1970 | Henzman | 56/244 X |
| 2,514,861 | 7/1950 | Hackerott | 56/245 X |
| 3,384,417 | 5/1968 | Mylewski | 299/82 |
| 493,659 | 3/1893 | Slade | 299/82 |

Primary Examiner—Louis G. Mancene
Assistant Examiner—J. A. Oliff
Attorney—C. Hercus Just, Joseph A. Brown, John C. Thompson and James J. Kennedy

[57] ABSTRACT

An impact type cutter bar unit utilizing an endless belt type cutter assembly having cutters spaced along the same and projecting laterally outward from the outer face of the belt for free impact engagement with agricultural material to be cut thereby, the cutter assembly being supported and guided by pulleys and driven by a drive pulley connected to power means, and including a simple, rigid Z-shaped main supporting bar providing elongated rigidity and upper and lower compartments in which the opposite elongated courses of the belt-type cutter assembly travel. The cutter bar unit also has vibration-inducing mechanism in the form of unbalanced pulleys to aid in freeing the cutters of debris.

8 Claims, 10 Drawing Figures

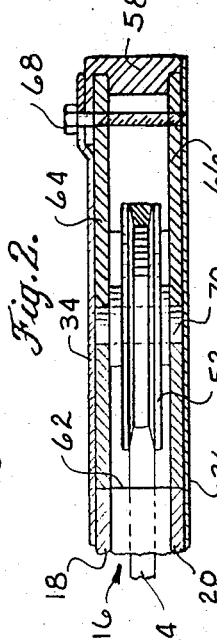
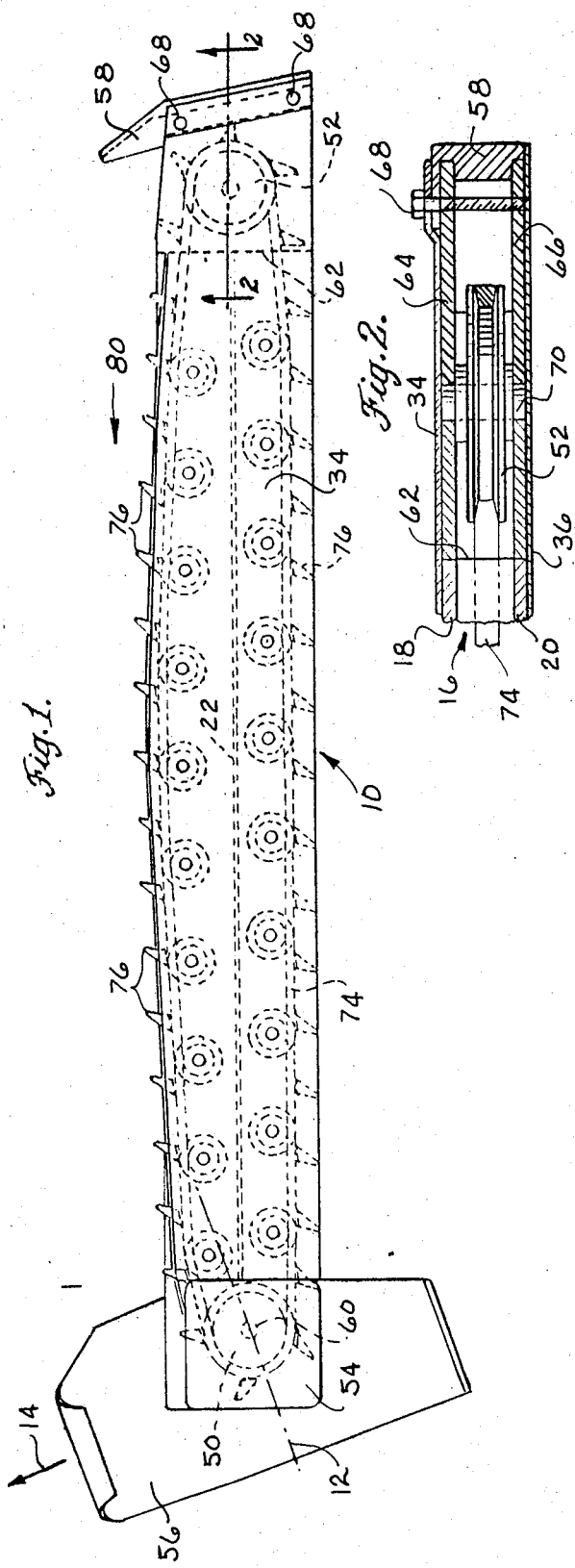
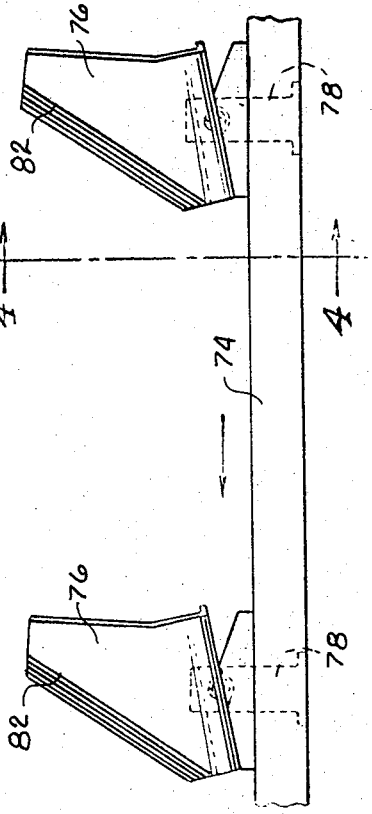
INVENTOR
JOSEPH C. HURLBURT

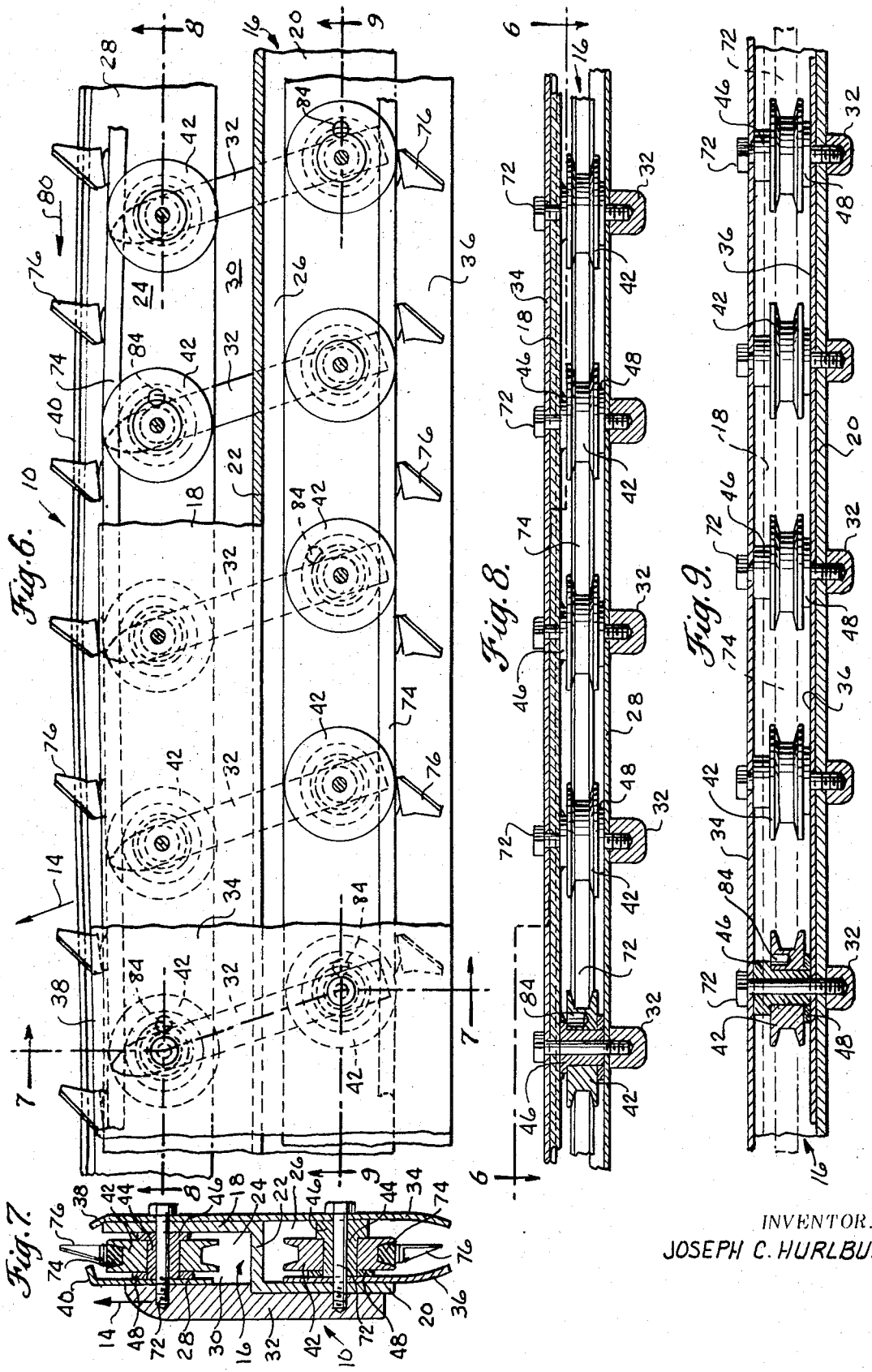

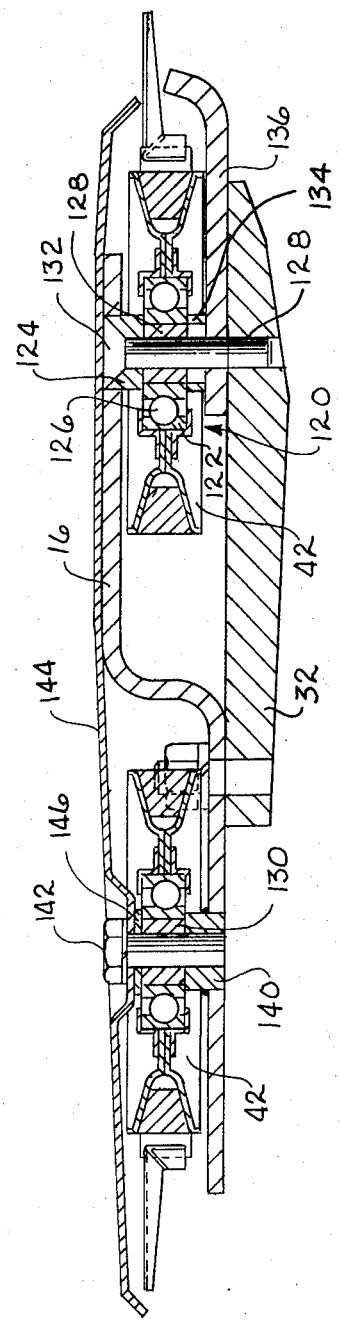

CUTTER BAR FOR MOWER

CROSS REFERENCE TO RELATED APPLICATIONS

This application discloses subject matter which is claimed in later copending applications assigned to the same assignee as this application, these applications being U.S. Pat. Ser. No. 129,099 filed Mar. 23, 1971 and entitled "Belt Carried Cutters and Mounting Means Therefore," and U.S. Pat. Ser. No. 127,111 filed Mar. 23, 1971 and entitled "Blade Mount for Belt Mowers."

BACKGROUND OF THE INVENTION

The present invention pertains to a cutter bar for a mower in which an endless belt or chain is provided with a series of cutter blades projecting outwardly from said chain at longitudinally spaced intervals and preferably adapted for impact type cutting. A cutter of this type which is presently available is illustrated in U.S. Pat. No. 2,782,582 in the name of McClearen. The belt is guided around a series of sheaves. Certain cutter bars of this type are of an elongated nature and are adapted particularly for cutting agricultural forage crops which, after being cut and permitted to dry in the field, may be arranged in windrows and subsequently baled. Such use is merely set forth for purposes of illustration rather than restriction however.

Particularly in cutting machines in which such elongated cutter bars are utilized, and especially where the forward course of a flexible chain or belt is disposed so that the cutters project forwardly from a supporting frame so as to engage the forage crops to be cut thereby, it is customary to provide a series of spaced pulleys which back up said course of the belt or chain so as to position the cutter blades for impact type cutting without cooperation with fixed fingers as are so commonly used in mower bars which have been available for many years in power-driven or horse-drawn sickle-bar mowers. One of the principal disadvantages of such sickle bar type mowers is that, especially where the crop tends to be wet or coarse and heavy, there is a very objectionable tendency for the stationary fingers of the sickle bar mower to become jammed and wedged into inoperable condition which requires the clearing of the sickle bar before further cutting can be undertaken. As a result of this, cutter bars which utilize impact type cutting blades have become very popular but certain problems have been presented thereby, as follows.

Under many conditions of operation, cutter bars of the type referred to, when moved along a field, operate very close to the ground. Ground of this type is seldom level and the normal uneven condition thereof presents small clumps or hillocks of earth which, when engaged by such cutter bars, tend to cause dirt, stones and other debris to be contacted by the flexible belt or chain and cutting blades thereon and this extraneous material is moved into contact with the idler pulleys which back up the flexible chain or belt and impair the bearings thereof.

There also is a tendency for dirt and debris of this type to accumulate within chambers or other recesses within which the back up pulleys are mounted. Such an arrangement, therefore, still requires that the operation of the cutter bar be stopped occasionally and the chamber or recesses within which the idler pulleys are mounted must be cleaned in order to continue normal operation of the cutter bar in addition to attempting to minimize the wear upon the bearings of the pulleys from the dirt, grit and the like which accumulates therein under the foregoing conditions.

SUMMARY OF THE INVENTION

It is the principal object of the present invention to provide an elongated cutter bar unit for use with a belt type mower having an elongated frame adapted to be moved along a field adjacent the ground and provided with an elongated forward compartment in which an endless belt having projecting cutter blades thereon moves transversely to the direction of movement of the cutter bar unit over said field, said compartment also being provided with guide means, which preferably comprise a row of guide pulleys, which engage and back up elongated courses of said belt, and said compartment having an elongated discharge opening extending along the lower portion thereof, rearwardly of said belt, to permit free discharge of debris downwardly and rearwardly from said compartment, thereby minimizing or eliminating any substantial accumulation of debris within said compartment and thus adding to the life of the bearings of said guide pulleys and the cutter bar unit in general.

It is another object of the invention to provide an elongated frame member for said cutter bar unit which primarily comprises an upper, forward flange; a lower rearward flange at a level substantially parallel to but lower than the upper flange; and a connecting rib extending substantially perpendicularly between said flanges and fixed thereto respectively to form said elongated forward compartment and also an elongated rearward compartment, within which compartments said forward and rearward courses of said elongated belt are movable with respect to rows of guide pulleys respectively provided in said compartments, said frame thus being substantially Z-shaped in cross-section to rigidify the same while permitting overall lightness in weight of said cutter bar unit and also readily forming said forward and rearward compartments in such manner that the forward compartment readily discharges dirt or other debris which enters the same incident to the operation of the belt which is guided by said pulleys, while simultaneously providing ample protecting means for the pulleys in the rearward compartment and the course of the belts supported thereby.

A further object of the invention ancillary to the object set forth in the paragraph immediately above, is to provide an elongated bottom plate extending along the forward compartment below the guide pulleys but spaced from the connecting ribs in order to provide said aforementioned elongated discharge opening which comprises a slot of sufficient width to offer substantially no imedence to the immediate discharge of debris entering said forward compartment and, in addition, bracing the pivot means for said idler pulleys in the forward compartment by extending said pivot means through the upper, forward flange and said bottom plate.

Still another object of the invention is to provide certain of said idler pulleys with means which render them imbalanced and thereby effecting vibration of the cutter bar unit of sufficient magnitude that any cut material which tends to accumulate on the upper portion of the housing of said cutter bar unit will be jostled therefrom and thus not interfere with the progressive cutting of additional forage crops and the like by the cutter bar unit.

Details of the foregoing objects and of the invention, as well as other objects thereof, are set forth in the following specification and illustrated in the accompanying drawings comprising a part thereof.

DESCRIPTION OF THE DRAWINGS

FIG. 1 is a top plan view of an elongated cutter bar unit employing a belt-type mower and embodying the principles of the present invention.

FIG. 2 is a fragmentary, enlarged vertical sectional view of the right-hand end of the cutter bar unit shown in FIG. 1 as seen on the line 2—2 of said figure.

FIG. 3 is an enlarged, fragmentary top plan view of a portion of the belt and several cutter blades attached thereto which are of the type illustrated in FIG. 1.

FIG. 4 is a transverse sectional view of the belt and cutter blade shown in FIG. 3 as seen on the line 4—4 of said figure.

FIG. 5 is a fragmentary end view of one of the knife blades illustrated in FIGS. 3 and 4 and shown connected to a section of said belt.

FIG. 6 is an enlarged plan view of a fragmentary portion of the cutter bar unit shown in FIG. 1 with certain parts broken away to illustrate details thereof, said view essentially being taken on the line 6—6 of FIG. 8.

FIG. 7 is a transverse sectional view of the cutter bar unit shown in FIG. 6 as seen on the line 7—7 of said figure.

FIG. 8 is a longitudinal sectional elevation of the fragmentarily illustrated cutter bar unit shown in FIG. 6 as seen on the line 8—8 of said figure.

FIG. 9 is a view similar to FIG. 8 but showing a vertical fragmentary section of the cutter bar unit of FIG. 6 as seen on the line 9—9 of said figure.

FIG. 10 is a view similar to FIG. 7 but showing a modified construction.

DESCRIPTION OF THE PREFERRED EMBODIMENTS

Referring to the drawings and especially to FIGS. 1 and 6, it will be seen that the elongated cutter bar unit 10 is specifically illustrated as being disposed at an acute angle, which for illustrative purposes only is shown as being approximately 15°, with respect to a line 12 representing an axis perpendicular to the intended forward direction of movement of the cutter bar unit as illustrated by the direction arrow 14 in FIG. 1. It is to be understood however, that if desired, the elongated cutter bar unit 10 may be disposed at any other angle, including 90°, with respect to the direction of movement of the unit represented by the arrow 14.

It also will be understood that said cutter bar unit 10 may be employed in association with other elements and mechanisms associated with various types of forage crop harvesting and treatment units or, if otherwise desired, said cutter bar unit may be used simply and solely to cut or mow forage crops such as hay, clover, alfalfa, and many other types of such crops. The principal purpose of the invention is to provide a rigid, relatively light weight, simplified cutter bar unit readily capable of self-discharge of dirt, grit, and other extraneous material encountered during the movement of said cutter bar unit over a field which is to be mowed thereby, the cutting usually being effected adjacent the ground surface of the field. Tufts, hillocks, and other sources of unevenness found in a normal field may be successfully encountered by such cutter bar unit without serious impairment or damage due to the structure thereof.

One of the basic improvements afforded by the present invention comprises the elongated base frame 16 which, in its preferred construction as illustrated specifically in the drawings, is what is known as Z-shaped in cross-section. This is best illustrated in FIG. 7. Also, referring to FIG. 7, it will be understood that the cutter bar unit 10 moves in the direction of the arrow 14. Accordingly, the elongated base frame 16, when in operation, comprises an upper forward flange 18, a rearward lower flange 20, and a connecting rib 22 which extends preferably substantially perpendicularly between the rearward edge of the upper forward flange 18 and the forward rearward lower flange 20 and is integrally connected respectively thereto.

Said elongated base frame 16 may be formed from any suitable material such as sheet steel, aluminum, or other appropriate metal which, because of the shape thereof, may be formed either by extrusion, rolling a strip, bending a sheet, or otherwise, to form the desired shape from a selected metal which preferably is rigid, and, especially because of the shape, is highly capable of resisting appreciable bending or flexing either in a horizontal or vertical plane during use of the unit.

In addition to the rigidity which is imparted to the cutter bar unit by the base frame 16, an additional advantage resides in the fact that it defines an elongated forward compartment 24 and an elongated rearward compartment 26. The forward compartment 24 is also somewhat further defined by an elongated bottom plate 28 which is parallel to and disposed in spaced relationship to the upper forward flange 18 and substantially within the plane of the rearward lower flange 20. The rearward edge of the bottom plate 28 is spaced an appreciable distance from the connecting rib 22 so as to define a continuous, elongated discharge opening or slot 30. That is, it is continuous and unobstructed between opposite ends of the cutter bar unit 10 except for a series of relatively narrow, transversely extending shoes or skid members 32 which extend across said opening 30. The purposes of said shoes or skid members 32 are set forth hereinafter.

The elongated rearward compartment 26 is further defined by the rearward portion of an elongated top shield 34 which directly overlies the upper surface of the upper forward flange 18 and extends rearwardly therefrom in parallel, but vertically spaced relationship to the rearward lower flange 20. The rearward edge of top shield 34 is parallel to but extends rearwardly beyond the outer edge of flange 20 a predetermined amount for purposes to be described.

Overlying the upper inner surface of lower flange 20 is a lower shield plate 36, the outer edge of which is substantially coextensive with the outer edge of top shield 34, whereby said rearwardly extending outer portion of the top shield 34 comprises upper shield means. The forward edge 38 of top shield 34 preferably extends slightly beyond the forward edge of the upper forward flange 18, as best shown in FIG. 7. Also, the forward edge 40 of bottom plate 28 is bent upwardly a short distance relative to the plane of the plate 28 and is substantially coextensive with, as well as being parallel to, the forward edge 38 of top shield 34, as likewise is shown in FIG. 7.

The elongated forward and rearward compartments 24 and 26 of the cutter bar unit 10 respectively accommodate rows of similar idler pulleys 42 which preferably have grooved peripheries. The pulleys in both rows thereof are disposed within a common plane which is parallel to the top shield 34 for example. Said pulleys are rotatably supported by bearings 44, which are somewhat in the shape of bushings and may be formed from appropriate material such as bronze or brass. The bearings 44 preferably are provided with annular shoulders 46 on one end and the opposite ends of said bearings extend through spacing washers 48 which preferably are formed from material similar to that from which the bearings 44 are formed. The washers 48 abut the inner surfaces of bottom plate 28 in forward compartment 24 and lower shield plate 36 in rearward compartment 26. Thus, the washers 48 and annular shoulders 46 serve to space the idler pulleys 42 respectively from the flanges of the elongated base frame 16 and the plates which are vertically spaced therefrom in parallel relationship thereto.

Disposed at opposite ends of the cutter bar unit 10 are a pair of sheaves 50 and 52. One of said sheaves, preferably sheave 50, is adapted to be driven by being connected to power means, not shown, normally available on a tractor or other type of agricultural implement with which the cutter bar unit 10 is associated. Accordingly, the opposite sheave is an idler. Also connected to the cutter bar unit 10 adjacent sheave 50 for example, is a gear box 54 to which said aforementioned power means is directly connectable by appropriate means, not shown. Further, the end of the cutter bar unit 10 to which the gear box 54 is connected likewise preferably has a ground-engageable mower shoe 56 connected thereto. The lower surface of said shoe preferably is substantially within the plane of the normal surfaces of the shoe or skid members 32. The opposite end of the cutter bar unit 10 is provided with an end shield 58.

The sheave 50 has a supporting axis 60 which is substantially in line with the connecting rib 22. Accordingly, the end of said rib nearest sheave 50 is removed from the elongated base frame 16 incident to manufacturing the unit. Similarly, at the opposite end of the unit 10, the base frame 16 is discontinued along the exemplary line shown in FIGS. 1 and 2 and filler or extension plates 64 and 66 are connected suitably to the outermost end of the base frame 16 by any appropriate means such as by utilizing the overlying end portions of the top shield 34 and lower shield plate 36 which, as best shown in FIG. 2, employs several bolts 68 to extend through said top and lower shield plates 34 and 36, extension plates 64 and 66, and an appropriate flange on end shield 58. Other appropriate mechanical equivalents may be used if desired.

A suitable pintle 70 extends through the plates 64 and 66, for example, to support the sheave 52, as shown in FIG. 2, and the axis 60 for drive sheave 50 comprises an appropriate shaft extending from gear box 54 for example.

Referring to FIGS. 7 – 9, it will be seen that relatively simple securing means connect most of the components of the cutter bar unit 10 into assembled relationship. The principal elements accomplishing this are bolts 72 which extend through appropriate axially aligned holes in the top shield 34, the flanges 18 and 20 of base frame 16, bottom plate 28 and lower shield plate 36, as well as through the axial holes in the bearings 44, and the threaded terminal ends of said bolts ultimately engaging threaded bores in the shoe members 32. Appropriate lock washers, not shown, may be used to secure said elements in tightly assembled relationship. Under such circumstances, it also will be seen that the bearings 44, which are of a bushing character, serve as spacer elements to prevent tightening the idler pulleys 42 against rotation. Also, the heads of the bolts 72 preferably are disposed uppermost, adjacent the top shield 34 to facilitate manipulation of the bolts during assembly and also otherwise to simplify the construction.

Extending around the forward and rearward rows of idler pulleys 42 and also around the sheaves 50 and 52 is an endless flexible member 74 which may be either a belt, such as a V-belt, which is specifically illustrated in the drawings, or a link-type chain, which is not illustrated specifically but nevertheless is intended to be represented by the outline of the flexible member 74 illustrated in the drawings. Therefore, hereinafter in the specification as well as in the appended claims, it is intended that the term 37 belt" is intended to encompass either a flexible belt of suitable type, a link chain, or an appropriate cable of suitable shape, all of which are capable of being guided by the rows of idler pulleys 42 as well as being driven by one of the sheaves 50 or 52 and otherwise extending around the other sheave which will be an idler under the circumstances. Thus, the power driven sheave will drive the flexible member 72 within a single plane and, if desired, the sheave 52, for example, may be provided with means for moving the pintle 70 predetermined limited distances toward and from the axis 60 of sheave 50 so as to appropriately tension the flexible member 74 incident to the same becoming worn, as well as the sheaves 50 and 52 being worn. Any appropriate conventional mechanisms for such purposes may be used and no specific example thereof is illustrated.

The endless flexible members 74 support, preferably in evenly spaced relationship to each other, a series of cutter blades 76 of the impact type. Appropriate connecting means 78, which do not comprise part of the present invention, appropriate connect the cutter blades 76 at one end to the endless flexible members 74. Such connection preferably is in a manner to permit limited yieldability of the cutter blades 76 with respect to the flexible members 74 which support and carry the same in cutting direction, as indicated by the arrow 80 in FIGS. 1 and 6. The cutting edge 82 on each blade 76 thus is disposed forwardmost relative to the direction of movement of the flexible member 74.

By reference to FIGS. 1, 6 and 7, it will be seen that a substantial portion of the cutter blades 76 extend outwardly beyond the forward edge 38 to top shield 34 and forward edge 40 of bottom plate 28 so as to effect impact type of cutting by said blades. Such cutting preferably is accomplished when the blades are moving at high speed in cutting direction, which is transverse to the path of movement of the cutter bar unit 10.

Thus, there is no impedence offered as a result of cut material becoming compacted in slotted fingers and the like such as are commonly employed in conventional sickle bar structures in which fixed fingers, spaced along the frame means of a so-called sickle bar tend to become jammed and clogged especially when encountering dense, wet or soggy, as well as tough types of different forage materials and the like. However, it will be seen that the cutter blades 76 are exposed only on the forward, cutting edge of the unit 10, while along the rear edge thereof, the outer edges of top shield 34 and lower shield plate 36 project beyond the tips of the blades 76 and thus prevent the same contacting any object which might come in contact with the trailing or rearward edge of the unit 10.

Due to the fact that the cutter bar unit 10 is intended to be moved along a field to be mowed thereby, in close proximity to the ground over which the unit is moving, it is impossible to prevent the ingress of dirt or soil, grit, pebbles, and bits of cut vegetation into the elongated forward compartment 24. However, due to the particular arrangement of the Z-shaped cross-section of the base frame 16, and the relatively wide and elongated discharge opening 30 which opens downwardly from the rear portion of the compartment 24 between each of the relatively narrow shoe member 32, ample self-clearance of the debris which may enter compartment 24 is achieved automatically, whereby the incidence of wear upon the endless flexible member 74, idler sheaves 42 and the bearings 44 therefor is minimized, especially in comparison with currently and previously used mechanism adapted for similar types of mowing but in which other supporting frame structures are employed which do not include such effective discharge means for extraneous material which is encountered in operation by the cutter bar unit of the type to which the present invention pertains.

In addition, the substantially Z-shaped cross-section of base frame 16 and especially the rearward lower flange 20 and connecting rib 22 thereof form principal elements of the elongated rearward compartment 26 within which the idling or return course of the flexible member 74 and the cutter blades thereon travel incident to the cutter blades being returned to the forward or operative course of the flexible members 74 and the cutter blades thereon, such as while traveling through the elongated forward compartment 24.

Particularly when the cutter bar unit is mowing forage or other agricultural crop material which is relatively wet, there is a tendency for the cut material to fall rearwardly and somewhat accumulate upon the upper surface of the top shield 34. Such accumulation impedes the effective cutting of additional material as the cutter bar unit moves across the field. To minimize or substantially completely prevent such accumulation of cut material upon the upper surface of top shield 34, the present invention provides means for vibrating the cutter bar unit 10 and especially the top shield 34 thereof to such extent that any cut material which tends to accumulate upon said top shield is vibrated or jostled adequately to effect removal thereof to the rear of the cutter bar unit a it moves along a field.

To accomplish such vibration particularly of the top shield 34, the idler pulleys 42 are utilized as a very simple and convenient means to accomplish the desired result. This is preferably achieved by providing an imbalance at least in certain of the idler pulleys, preferably in a staggered pattern. One very simple way of accomplishing such imbalance is to drill holes 84, of suitable diameter and depth, into one face of the idler pulleys 42, as shown in exemplary manner in FIGS. 6, 8 and 9, whereby the center of gravity of the mass of the material comprising the idler pulleys thus drilled will be eccentric to the rotational axis thereof. If desired, different sizes of holes may be formed in different idler pulleys and thereby further tend to enhance the vibration of the cutter bar unit and especially the top shield 34 thereof so as to dislodge any cut material which tends to accumulate thereon and such material automatically will be discharged to the rear of the cutter bar unit.

Referring now to the modification shown in FIG. 10 the pulleys 42 are supported on the outer race 122 of a ball bearing, indicated generally at 120. The bearing also has an inner race 128 and balls 126. The pulley is either press fit or shrunk fit about the race 122. Front and rear stub shafts 128, 130, respectively pass through the inner races 128. The front stud shaft is held in place by a hex socket head bolt 132 which passes through a spacer 124 in the frame 16 and is threaded into the shoe 32. Disposed between the lower surface of the inner race and the shoe 32 is a spacer 134 and a guard 136. The rear stub shaft 130 has a shoulder portion 140 welded to the rear of the frame 16 and a bolt 142 is threaded into the stub 130 and bears against the upper surface of the inner race through the upper guard 144 and spacer 146.

While the invention has been described and illustrated in its several preferred embodiments, it should be understood that the invention is not to be limited to the precise details herein illustrated and described since the same may be carried out in other ways falling within the scope of the invention as illustrated and described.

What is claimed is:

1. A belt mower cutter bar unit comprising an elongated base frame having elongated forward and rearward compartments, a series of longitudinal spaced idler pulleys mounted in both of said compartments and disposed substantially within a common plane, a drive pulley rotatably mounted adjacent one end of said frame within the plane of said idler pulleys and in additional idler pulley mounted adjacent the opposite end of said frame within said plane, an endless belt extending along said series of idler pulleys and around said drive and additional idler pulleys, and a series of impact type cutter blades connected along said belt in spaced relationship to each other and projecting substantially perpendicularly from the outer surface of said belt, said blades having cutting edges projecting beyond said forward compartment; the novel feature of said unit comprising said base frame in cross-section being in the form of a unitary elongated Z-shaped structural member having an upper substantially horizontal forwardly extending flange portion parallel to said pulleys, a lower substantially horizontal rearwardly extending flange portion parallel to and lower than said upper flange portion, the inner edges of said upper and lower flange portions being connected integrally to the upper and lower edges of a narrow substantially vertical intermediate connecting rib to define the height and inner elongated boundaries of said forward and rearward compartments and brace said frame against appreciable flexing thereof in vertical and horizontal directions, said forward compartment being at least partially open along the bottom, and shoe members extending transversely across said lower horizontal flange portion and said lower compartment below said pulleys and cutter blades on said belt in longitudinally spaced relationship to each other along said base frame to provide spaces between said shoe members opening downward from said forward compartment for ready discharge of debris therethrough.

2. The cutter bar unit according to claim 1 further including an elongated bottom member extending along and defining a portion of said forward compartment, said bottom member being positioned below said idler pulleys and also being provided with pivot means for said idler pulleys extending from said upper horizontal flange portion and said elongated bottom member to brace said pivot means.

3. The cutter bar unit according to claim 2 in which said elongated bottom member is spaced at its rearward edge from said connecting rib to provide elongated discharge openings in the lower rearward portion of said forward compartment for said ready discharge of debris therethrough.

4. An elongated cutter bar unit for a belt type mower comprising in combination, an elongated frame adapted to be moved along a field to mow the same, idler pulleys spaced along said frame, an endless belt movable upon said frame and engaging said idler pulleys for at least partial support thereby, a driving sheave supported by said frame and engaged by said belt to propel the same, said belt having a course movable along a portion of said frame which is forward thereon during use, spaced impact type cutter blades connected to said belt for movement thereby in cutting direction, said frame having a top shield thereon above said idler pulleys and belt, and means on at least certain of said idler pulleys operable during rotation thereof to render the same imbalanced for causing vibration of at least said top shield to cause cut material to be jostled therefrom and thereby prevent accumulation of said material upon said shield.

5. The cutter bar unit according to claim 4 in which the mass of the material of said certain of said idler pulleys is eccentric to the rotational axis thereof to produce said imbalance of said pulleys.

6. The cutter bar unit according to claim 4 in which said idler pulleys are drilled in spaced relation to the axis thereof to produce said imbalance therein.

7. The cutter bar unit according to claim 4 in which said idler pulleys on said frame are disposed in two elongated rows thereof and respectively engage the forward and rearward courses of said belt, certain pulleys of both rows of said pulleys being rendered imbalanced to produce said vibration of said top shield of said unit.

8. The cutter bar unit according to claim 7 in which said idler pulleys are rotatable upon pivot means and said pivot means being directly connected to said top shield, thereby to directly impart vibration thereto.

* * * * *